United States Patent [19]
Brandolese et al.

[11] Patent Number: 5,756,563
[45] Date of Patent: May 26, 1998

[54] PROCESS FOR THE PREPARATION OF STABLE MIXTURES OF BITUMEN AND POLYMER

[75] Inventors: Ernesto Brandolese, Graffignana; Luigi D'Elia, Pisa; Paolo Italia, Milan; Nicola Onorati, Matera, all of Italy

[73] Assignee: AGIP Petroli S.P.A., Rome, Italy

[21] Appl. No.: 565,810

[22] Filed: Nov. 30, 1995

[30] Foreign Application Priority Data

Jan. 12, 1994 [IT] Italy ............................ MI94A2437

[51] Int. Cl.$^6$ ............................... C08J 3/22; C08L 95/00
[52] U.S. Cl. .................................. 523/351; 54/59; 54/64; 54/68
[58] Field of Search ....................... 523/351; 524/59, 524/64, 68, 71

[56] References Cited

U.S. PATENT DOCUMENTS 5,256,712  10/1993  Langumier et al. .

FOREIGN PATENT DOCUMENTS 0458386  11/1991  European Pat. Off. ............ 524/68
A-2424942  4/1980  France .
A-1201135  9/1968  United Kingdom .
A-2018045  9/1968  United Kingdom .

*Primary Examiner*—Peter A. Szekely
*Attorney, Agent, or Firm*—Rogers & Wells; George P. Hoare

[57] ABSTRACT

Mixtures of bitumen and thermoplastic polymer stable to storage are prepared by a process comprising:

(i) mixing a bituminous product having a content of total asphaltenes, resins, saturated and aromatic products which satisfies the condition that the $I_c$ value is between 0.200 and 0.270 in the expression:

$$I_c=(C7+C5+S)/(A+R)$$

with a thermoplastic polymer, the reaction being carried out at a temperature of between 160° C. and 200° C. and for a time of between 15 and 120 minutes and (ii) diluting the bituminous composition obtained in (i) with a bitumen or bituminous component having an $I_c$ defined as specified above in (i) of between 0.270 and 0.700 in such a quantity that the final concentration of the polymer is between 2.5 and 15% by weight, and heating to a temperature of between 160° C. and 200° C. for a time of between 30 and 90 minutes.

15 Claims, No Drawings

PROCESS FOR THE PREPARATION OF STABLE MIXTURES OF BITUMEN AND POLYMER

The present invention relates to a process for the preparation of mixtures of bitumen and thermoplastic polymer which are stable to storage.

It is known that in order to improve the quality of bitumens, particularly from the rheological point of view, various types of polymers, particularly copolymers of the elastomeric type, are often used.

For example, U.S. Pat. No. 4,217,259 discloses the use of symmetrical radial copolymers consisting of diene blocks and vinylaromatic blocks; U.S. Pat. No. 4,585,816 describes the use of block copolymers of a monoalkenylaromatic and a conjugated diolefin; U.S. Pat. No. 3,915,914 discloses the use of homo and copolymers of 1-butene; U.S. Pat. No. 3,615,830 describes isoolefins copolymers, particularly polyisobutene.

The most effective polymeric additives seem to be styrene-diolefin block copolymers, particularly styrene/butadiene and styrene/isoprene. Bitumens thus modified can be destined to be used when performances are required for which normal bitumens are insufficient. In this respect applications can be mentioned in the field of drained and sound-absorbent conglomerates, water-proofing products and bituminous emulsions.

However the polymers used for modifying the properties of bitumens generally have the drawback of being poorly compatible with the bitumens themselves. This incompatibility can be seen in conditions of sufficient fluidity, for example storage at high temperatures, with the tendency of the two components to separate under resting conditions; in this way a polymer-rich top layer and a bitumen-rich bottom layer are formed.

It is therefore very important, to obtain a correct and advantageous use of the bitumen-polymer mixtures, that they are stable to storage at a high temperature.

In order to solve this problem, numerous processes have been proposed in the art which are based on the use of particular additives and/or high temperatures. For example BE-858.770, BE-858.771 and BE-870.287 describe reactions of bitumen with polyolefins having one or more double bonds. The polyolefin is anchored to the bitumen with sulphur which acts as cross-linking agent.

Again IT-AMI91A/00169 describes a process which consists in reacting at a temperature of about 225° C. the bitumen-polymer mixture with an unsaturated bicarboxylic acid, or its anhydride, particularly maleic anhydride. This process has the drawback deriving from the toxicity of the maleic anhydride.

It has now been found that storage-stable mixtures of bitumen and thermoplastic polymer can be prepared at not high temperatures and without additives by the use in sequence of bituminous products having a different content of resins, asphaltenes, aromatics and saturated products (paraffins).

In accordance therewith, the present invention relates to a process for preparing mixtures of bitumen and thermoplastic polymer which are stable to storage, the process being characterized in that:

(i) a bituminous product having a content of total asphaltenes, resins, saturated and aromatic products which satisfies the condition that the $I_c$ value is between 0.200 and 0.270 in the expression:

$$I_c = (C7+C5+S)/(A+R)$$

wherein:

$C7$=concentration of asphaltenes precipitated with N-heptane in % weight;

$C5$=concentration of asphaltenes precipitated with N-pentane in % weight;

$S$=concentration of saturated products (paraffins) in % weight;

$A$=concentration of aromatics in % weight; and $R$=concentration of resins in % weight is reacted at a temperature of between 160°C. and 200° C. and for a time of between 15 and 120 minutes with a thermoplastic polymer in a weight ratio of between 80:20 and 95:5; and (ii) the bituminous composition thus obtained is diluted with a bitumen or a bituminous component having an $I_c$ defined as specified in (i) of between 0.270 and 0.700 in such a quantity that the final concentration of the polymer is between 2.5 and 15%, and this is heated to a temperature of between 160° C. and 200°C. for a time of between 30 and 90 minutes.

In step (i) of the process of the present invention, the bituminous products are those containing asphaltenes precipitated with n-heptane and n-pentane, resins, aromatics and saturated products in such proportions as to satisfy the above condition.

For these products the $I_c$ value, as defined above, is preferably between 0.240 and 0.260.

The bituminous products consist of a bituminous component selected from distillation bitumens, aromatic distillates from petroleum or, preferably, from mixtures of these provided that the resulting mixture satisfies the ($I_c$) requisites specified above.

Particularly suitable for the purposes of the present invention are aromatic extracts from a lubricant base or a mixture of aromatic extract and vacuum residue.

The polymers which can be used in step (i) of the process of the present invention are copolymers of the elastomeric type. Particularly useful are block copolymers containing vinylbenzenes and conjugated dienes having a radial structure. This group of polymers can be represented with the general formula $X(A-B)_m$ wherein A is a block obtained from monomers of the vinylaromatic type, B is a block obtained from dienic monomers, X is a radical deriving from a coupling agent and m is number depending on the coupling agent used and is normally comprised within the range from 3 to 5 or more.

Particularly useful for obtaining stable mixtures are radial copolymers containing polystyrene and polybutadiene blocks (so-called SBS), usually with a ratio styrene/butadiene of between 20/80 and 40/60 and a weight average molecular weight of between 50,000 and 1,000,000. Particularly preferred are copolymers with a ratio styrene/butadiene of between 25/75 and 35/65 and a weight average molecular weight of between 100,000 and 400,000. These copolymers can also be used in an oil-extended form.

It is convenient for step (i) to be carried out with a weight ratio between the bituminous product and polymer of between 80:20 and 95:5, preferably 85:15–90:10. Higher quantities of polymer are undesirable as they increase the viscosity of the mixture with consequent operating difficulty, whereas lower quantities do not produce sufficient effects in modifying the bituminous product.

The mixing and homogenization of the bituminous product and polymer are conveniently carried out at a temperature of about 180° C. for a time of between 30 and 60 minutes. The resulting compositions are stable under hot storage conditions. Under these conditions the stratification or formation of heterogeneous zones are not observed, not even after long storage time periods, according to the "tube test" method reported in example 1.

In step (ii) of the process of the present invention, the bituminous composition obtained in step (i) is diluted with a bitumen or a bituminous component having an $I_c$ of between 0.270 and 0.700, preferably 0.280 and 0.500. To proceed with the dilution it is sufficient to mix the bituminous composition and bitumen or bituminous component in the desired proportions, at a temperature of about 160°–200° C., preferably 170°–180° C., for about 30–60 minutes. The proportions will depend on the characteristics of the bitumen or bituminous component and on those required for the final mixture.

It is convenient to use an amount of bitumen or bituminous component which is sufficient to obtain a final concentration of the polymer of between 2.5 and 6.0%. In this way it is possible to obtain a mixture of bitumen and polymer stable to storage with the desired characteristics of fluidity, particularly suitable in the field of street paving.

A bitumen having the $I_c$ characteristics specified above can be selected from distillation bitumens, precipitation bitumens, visbreaking products, oxidated bitumens or mixtures of various components of petroleum origin, provided that the mixture has the ($I_c$) requisites specified above.

Preferred bitumens are from propane, vacuum process, visbreaking or reconstructed with lube-cycle components or a mixture of these having an $I_c$ of between 0.270 and 0.700.

The bitumen-polymer mixtures stabilized according to the process of the present invention have good flexibility and elasticity characteristics and can be advantageously used as binders for road conglomerates having a high performance and for water-proofing membranes and in the field of bituminous emulsions.

In the following experimental examples components (A) to (N) and bituminous products obtained by mixing said components were used. The characteristics shown in table 1 are determined by first treating the bitumen with n-heptane to precipitate the fraction of asphaltenes with a high molecular weight. The part of bitumen dissolved in n-heptane is in turn treated with n-pentane to separate the asphaltenes with a low molecular weight. The fraction which is soluble in n-pentane (which normally represents 70–90% of the total and consists of maltenes) is subjected to analysis using a technique of the type described in ASTM D-2007.

Other characteristics of components (A–N) are shown in tables 1 and 2 below.

TABLE 2

| Component | | G | H | I | L | M | N |
|---|---|---|---|---|---|---|---|
| Viscosity 60° C. | P. | n.d. | n.d. | n.d. | 1.090 | 780 | 530 |
| Penetration | dmm | 14 | 11 | 11 | 98 | 98 | 111 |
| Ball/Ring | °C. | 62 | 61.5 | 63 | 45.5 | 45.5 | 45.5 |
| Total asphaltenes | w % | 19.4 | 21.5 | 23 | 15.3 | 16.1 | 18.7 |
| Saturated products | w % | 3.2 | 2.8 | 3.1 | 7.3 | 10.3 | 11.2 |
| Resins | w % | 70.6 | 70.0 | 62.2 | 67.5 | 66.4 | 58.7 |
| Aromatic products | w % | 6.8 | 5.7 | 11.7 | 9.9 | 7.2 | 17.7 |
| $I_c$ | — | 0.292 | 0.321 | 0.353 | 0.292 | 0.359 | 0.427 |

Components G, H, I = bitumen from propane
Component L = reconstructed bitumen
Component M = bitumen from vacuum process
Component N = bitumen from visbreaking The following examples are reported in order to better illustrate the invention.

EXAMPLE 1

A bituminous product is used, consisting of component A (29% by weight) and component B (71% by weight) having an $I_c$ equal to 0.256. A mixture is prepared containing 86.1% by weight of a bituminous product and 13.9% by weight of SBS having a weight average molecular weight of 250,000 and a weight ratio styrene/butadiene of 30/70.

The components are mixed for 60 minutes at 180° C. A bituminous composition having the following characteristics, is obtained:

| | |
|---|---|
| penetration at 25° C. | 93 dmm |
| softening point (P.A.) | 102° C. |

After 30 days of storage at 170° C. the bituminous composition does not show any difference from the P.A.s determined on samples taken from the top and bottom of the container, which indicates perfect stability to storage of the bitumen-polymer mixture.

The evaluation of the stability to storage is carried out by means of the "tube test" system which enables even slight differences of homogeneity, due to stratification or migration of the polymer contained in the mixture, to be observed. The test is carried out by introducing the mixture into a cylindrical tube closed at one end and placing this into an oven at 170° C. for a pre-established time. At the end of the test the tube containing the mixture is cooled to a low temperature, the casing is removed and the layers at the top and bottom of the cylinder consisting of the bituminous mixture made compact by the lowering of the temperature, are separated. The softening point is measured on these portions. The mixture is considered to be stable if the difference between the top values is not more than 2° C.

TABLE 1

| Component | | A | B | C | D | E | F |
|---|---|---|---|---|---|---|---|
| Viscosity 60° C. | cSt | 270 | 240 | 180 | $1.1 \times 10^3$ | $17.7 \times 10^3$ | $35.7 \times 10^3$ |
| Viscosity 60° C. | P. | 2.7 | 2.4 | 1.8 | 108 | 175 | 356 |
| Density 60° C. | g/cc | 0.995 | 0.985 | 0.981 | 0.989 | 0.987 | 0.998 |
| Total asphaltenes | w % | 0.5 | 0.2 | 0.1 | 11.2 | 11.9 | 14.8 |
| Saturated products | w % | 8.1 | 8.9 | 11.6 | 14 | 16 | 15.4 |
| Resins | w % | 41.0 | 37.8 | 35.5 | 63.7 | 58.8 | 52.1 |
| Aromatic products | w % | 50.4 | 53.1 | 52.8 | 11.1 | 13.3 | 17.7 |
| $I_c$ | — | 0.094 | 0.1 | 0.133 | 0.337 | 0.387 | 0.433 |

Components A, B, C = aromatic extract from lubricant base;
Components D, E, F = distillation residue (vacuum)

The bituminous composition obtained as described above is subsequently diluted at 180° C. for 60 minutes with component G (60.6%) in such a quantity as to have a final concentration of the SBS polymer of 5.5%.

A bitumen-polymer mixture is obtained, having the following characteristics:

| penetration at 25° C. | 60 dmm |
| softening point (P.A.) | 96° C. |

After 30 days of storage at 170° C. there is no difference between the P.A.s determined on samples taken from the top and bottom of the container, which indicates a perfect stability to storage of the bitumen-polymer mixture.

EXAMPLE 1 BIS (COMPARATIVE)

The SBS polymer is added to a bituminous product (94.5% by weight) consisting of components A (10.5% by weight), D (25.4% by weight) and G (64.1% by weight) having an $I_c$ of 0.280, in such a quantity as to have a final concentration equal to 5.5%.

This is then mixed at 180° C. for 120 minutes and a bituminous composition having the following characteristics is obtained:

| penetration at 25° C. | 53 dmm |
| P.A. | 103° C. |

After only one day of storage at 170° C., the difference between the P.A. of the top and that of the bottom is equal to 40° C., showing clear instability of the composition.

EXAMPLE 2

The SBS polymer with a final concentration equal to 13.9% by weight is added to a bituminous product consisting of components B (43% by weight) and E (57% by weight) having an $I_c$ equal to 0.247. The mixture is mixed at 180° C. for 60 minutes and a bituminous composition is obtained having the following characteristics:

| penetration at 25° C. | 141 dmm |
| P.A. | 87° C. |

After 15 days of storage at 170° C. no difference is observed between the P.A.s carried out on product samples taken from the top and bottom of the container. This shows the complete stability of the product.

The bituminous composition obtained as described above is subsequently diluted at 180° C. for 60 minutes with component H (60.6% by weight) in such a quantity as to have a final concentration of the SBS polymer of 5.5%.

A bitumen-polymer mixture is obtained having the following characteristics:

| penetration at 25° C. | 66 dmm |
| softening point (P.A.) | 76° C. |

After 30 days of storage at 170° C. no difference is observed between the P.A.s carried out on product samples taken from the top and bottom of the container. This shows the complete stability of the product.

EXAMPLE 2 BIS (COMPARATIVE)

A bituminous product consisting of components B, E and H in the same percentages as example 2, having an $I_c$ equal to 0.293 is mixed with the SBS polymer (final concentration equal to 5.5% by weight) at 180° C. for 120 minutes. The resulting bituminous composition has the following characteristics:

| penetration at 25° C. | 68 dmm |
| P.A. | 98° C. |

After only 1 day of storage at 170° C. there is a difference between the P.A.s carried out on product samples taken from the top and bottom of the container equal to 54° C., which shows clear instability of the composition.

EXAMPLE 2 TER (COMPARATIVE)

The same procedure is carried out as in example 2 using a bituminous product consisting of components B (29% by weight) and E (71% by weight) having an $I_c$ equal to 0.289.

The mixture is reacted at 170° C. for 60 minutes and a bituminous composition is obtained having the following characteristics:

| penetration at 25° C. | 98 dmm |
| P.A. | 106° C. |

After 30 days of storage at 170° C. there is a difference between the P.A.s carried out on product samples taken from the top and bottom of the container equal to 32° C., which shows clear instability of the mixture.

EXAMPLE 3

A bituminous product is used consisting of component C (55% by weight) and component F (45% by weight) having an $I_c$ equal to 0.250. A mixture is prepared containing 86.1% by weight of bituminous product and 13.9% by weight of SBS. The components are mixed at 180° C. for 60 minutes.

A bituminous composition is obtained having the following characteristics:

| penetration at 25° C. | 150 dmm |
| softening point (P.A.) | 79° C. |

After 30 days of storage at 170° C. no difference is observed between P.A.s carried out on product samples taken from the top and bottom of the container. This shows the complete stability of the product.

The bituminous composition is subsequently diluted at 180° C. for 60 minutes with component I (60.6%) in such a quantity as to have a final concentration of the SBS polymer equal to 5.5%.

A bituminous composition is obtained having the following characteristics:

| penetration at 25° C. | 80 dmm |
| softening point (P.A.) | 78° C. |

After 30 days of storage at 170° C. no difference is observed between the P.A.s determined on samples taken from the top and bottom of the container.

EXAMPLE 3 BIS (COMPARATIVE)

A bituminous product consisting of components C, F and I in the same percentages as example 3, having an $I_c$ equal to 0.314 is mixed with the SBS polymer (final concentration equal to 5.5% by weight) at 180° C. for 120 minutes. The resulting bituminous composition has the following characteristics:

| penetration at 25° C. | 75 dmm |
|---|---|
| P.A. | 91° C. |

After only 1 day of storage at 170° C. there is a difference between the P.A.s carried out on product samples taken from the top and bottom of the container equal to 56° C.

EXAMPLE 4

A bituminous product is used consisting of component L (71% by weight) and component A (29% by weight) having an $I_c$ equal to 0.227. A mixture is prepared containing 86.1% by weight of bituminous product and 13.9% by weight of SBS. The components are mixed at 180° C. for 120 minutes. A bituminous composition is obtained having the following characteristics:

| penetration at 25° C. | 72 dmm |
|---|---|
| softening point (P.A.) | 103° C. |

After 15 days of storage at 170° C. no difference is observed between P.A.s carried out on product samples taken from the top and bottom of the container.

The bituminous composition obtained as described above is subsequently diluted at 180° C. for 60 minutes with component L (60.6%) in such a quantity as to have a final concentration of the SBS polymer equal to 5.5%.

A bitumen-polymer mixture is obtained having the following characteristics:

| penetration at 25° C. | 104 dmm |
|---|---|
| softening point (P.A.) | 76° C. |

After 30 days of storage at 170° C. no difference is observed between the P.A.s determined on samples taken from the top and bottom of the container.

EXAMPLE 4 BIS (COMPARATIVE)

The SBS polymer is added to component L having an $I_c$ equal to 0.292 in such a quantity as to have a final concentration of 5.5% by weight.

The mixture is mixed at 180° C. for 60 minutes and a composition is obtained having the following characteristics:

| penetration at 25° C. | 60 dmm |
|---|---|
| P.A. | 99° C. |

After only 1 day of storage at 170° C. a difference is observed between the P.A.s carried out on product samples taken from the top and bottom of the container equal to 69° C.

EXAMPLE 5

The same procedure is carried out as in example 2, using in the dilution phase component M having an $I_c$ equal to 0.359 in such a quantity as to have a final concentration of the polymer equal to 2.75% by weight.

The resulting mixture has the following characteristics:

| penetration at 25° C. | 131 dmm |
|---|---|
| P.A. | 48° C. |

After 30 days of storage at 170° C. there is no difference between the P.A.s determined on samples taken from the top and bottom of the container, which shows the complete stability of the product.

EXAMPLE 5 BIS (COMPARATIVE)

The SBS polymer is added to component M (97.25% by weight) having an $I_c$ equal to 0.359 in such a quantity as to have a final concentration of 5.5% by weight.

The mixture is mixed at 180° C. for 60 minutes and a product is obtained having the following characteristics:

| penetration at 25° C. | 61 dmm |
|---|---|
| P.A. | 50° C. |

After only 1 day of storage at 170° C. a difference is observed between the P.A.s carried out on product samples taken from the top and bottom of the container equal to 19° C.

EXAMPLE 6

The same procedure is carried out as in example 1, using in the dilution phase component N in such a quantity as to have a final concentration of the polymer equal to 4.0% by weight.

The resulting mixture has the following characteristics:

| penetration at 25° C. | 115 dmm |
|---|---|
| P.A. | 81° C. |

After 15 days of storage at 170° C. there is no difference between the P.A.s determined on samples taken from the top and bottom of the container, which shows the complete stability of the product.

EXAMPLE 6 BIS (COMPARATIVE)

The SBS polymer is added to component N having an $I_c$ equal to 0.427 in such a quantity as to have a final concentration of 4.0% by weight.

The mixture is reacted at 180° C. for 60 minutes and a product is obtained having the following characteristics:

| penetration at 25° C. | 66 dmm |
|---|---|
| P.A. | 90° C. |

After only 1 day of storage at 170° C. a difference is observed between the P.A.s carried out on product samples taken from the top and bottom of the container equal to 37° C.

EXAMPLE 7

The oil-extended polymer (45 parts of paraffinic oil for every 100 parts of SBS) is added to a mixture of component B (47% by weight) and component E (53% by weight) having an $I_c$ equal to 0.237, in such a quantity as to have a final concentration of SBS equal to 14.4% by weight.

The mixture is mixed at 180° C. for 60 minutes and a product is obtained having the following characteristics:

| penetration at 25° C. | 141 dmm |
|---|---|
| P.A. | 87° C. |

After 30 days of storage at 170° C. no difference is observed between the P.A.s determined on samples taken from the top and bottom of the container, which shows the complete stability of the product.

The bituminous composition is subsequently diluted at 180° C. for 60 minutes with component H in such a quantity as to have a final concentration of the SBS polymer equal to 5.7%.

A bitumen-polymer mixture is obtained having the following characteristics:

| penetration at 25° C. | 104 dmm |
|---|---|
| softening point (P.A.) | 73° C. |

After 30 days of storage at 170° C. there is no difference between the P.A.s determined on samples taken from the top and bottom of the container.

We claim:

1. Process for the preparation of mixtures of bitumen and thermoplastic polymer stable to storage characterized in that:

(i) a bituminous product having a content of total asphaltenes, resins, saturated and aromatic products which satisfies the condition that the $I_c$ value is between 0.200 and 0.270 in the expression:

$$I_c = (C7+C5+S)/(A+R)$$

wherein

C7=concentration of asphaltenes precipitated with N-heptane in % weight,

C5=concentration of asphaltenes precipitated with N-pentane in % weight;

S=concentration of saturated products (parafins) in % weight;

A=concentration of aromatics in % weight; and

R=concentration of resins in % weight is reacted at a temperature of between 160° C. and 200° C. and for a time of between 15 and 120 minutes with a thermoplastic polymer, selected from the group consisting of copolymers and elastomers and elastomeric copolymers, in a weight ratio between each other of between 80:20 and 95:5; and (ii) the resulting bituminous composition is diluted with a bitumen or a bituminous component having an $I_c$ defined as specified in (i) of between 0.270 and 0.700 in such a quantity that the final concentration of the polymer is between 2.5 and 15%, and this is heated to a temperature of between 160° C. and 200° C. for a time of between 30 and 90 minutes.

2. Process according to claim 1, characterized in that in step (i) the bituminous product consists of one or more components selected from aromatic distillates of petroleum or distillation bitumens.

3. Process according to claim 2, characterized in that the bituminous product consists of an aromatic extract from a lubricant base and a vacuum residue in a weight ratio between each other that is such that the resulting mixture has an $I_c$ of between 0.200 and 0.270.

4. Process according to claim 1, characterized in that the bituminous product in step (i) has an $I_c$ of between 0.240 and 0.260.

5. Process according to claim 1, characterized in that in step (ii) the bitumen and bituminous component are selected from a distillation bitumen, a precipitation bitumen, a oxidated bitumen or a bitumen obtained by mixing various components of a petroleum origin.

6. Process according to claim 5, characterized in that the bitumen is selected from the group consisting of a bitumen from propane, a bitumen from visbreaking, a bitumen from a vacuum process, and a bitumen reconstructed with lube cycle components.

7. Process according to claim 1, characterized in that in step (ii) the bitumen and bituminous component have an $I_c$ of between 0.280 and 0.500.

8. Process according to claim 1, characterized in that the polymer is a block copolymer containing vinyl benzenes and conjugated dienes having a radial structure which can be represented with the formula $X(A-B)_m$, wherein A represents a block obtained from vinylaromatic monomers, B is a block obtained from dienic monomers, X is a radical deriving from a coupling agent and m is a number from 3 to 5.

9. Process according to claim 8, characterized in that the copolymer contains polystyrene and polybutadiene blocks with a ratio styrene/butadiene of between 20/80 and 40/60 and a weight average molecular weight of between 50,000 and 1,000,000.

10. Process according to claim 8, characterized in that the radial copolymer has a ratio styrene/butadiene of between 25/75 and 35/65 and a weight average molecular weight of between 100,000 and 400,000.

11. Process according to claim 8, characterized in that the copolymer is in an oil-extended form.

12. Process according to claim 1, characterized in that the temperature in steps (i) and (ii) is between 175° C. and 185° C. and the reaction time in the single steps is between 30 and 60 minutes.

13. Process according to claim 1, characterized in that in step (i) the weight ratio between the bituminous product and the polymer is between 85:15 and 95:5.

14. Process according to claim 1, characterized in that in step (ii) the weight ratio between the bituminous product and the polymer is between 98:2 and 94:6.

15. Mixtures of bitumen and polymer stable to storage prepared by the process according to the claim 14.

* * * * *